UNITED STATES PATENT OFFICE.

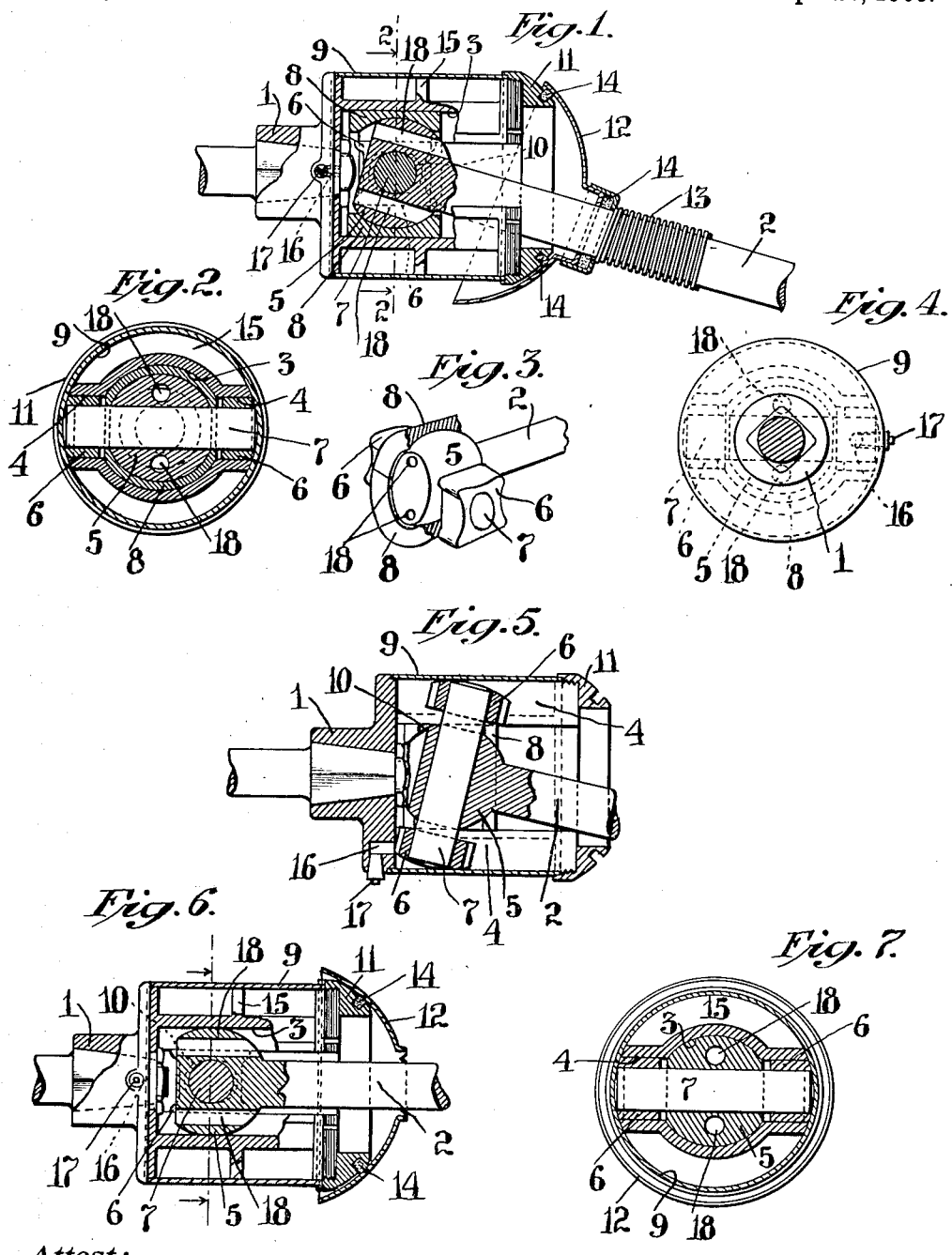

CLARENCE W. SPICER, OF PLAINFIELD, NEW JERSEY.

UNIVERSAL JOINT.

No. 919,651.  Specification of Letters Patent.  Patented April 27, 1909.

Application filed September 10, 1907. Serial No. 392,170.

*To all whom it may concern:*

Be it known that I, CLARENCE W. SPICER, a citizen of the United States, residing at Plainfield, in the county of Union and State of New Jersey, have invented certain new and useful Improvements in Universal Joints; and I do hereby declare the following to be a full, clear, and exact description of the same, such as will enable others skilled in the art to which it appertains to make and use the same.

My invention relates to universal joints, and embodies certain improvements upon the joint structure illustrated and described in my prior application filed Sept. 12, 1906, Sr. No. 334,222. The joints of that application belong to the class commonly known by the designation "T-head in slot," and comprise driving and driven members, and an intermediate member, which latter is pivoted to one of said driving and driven members and is mounted to slide back and forth longitudinally in guides of the other said member and also to oscillate in a plane at right angles to plane of movement about its said pivotal connection. Such joints are commonly used in the driving mechanism of motor vehicles, and are also adapted for use in boats and in machinery generally wherever a universal joint is required.

My invention consists in the novel structural features hereinafter described.

The object of my invention is to improve the construction of such joints, to prevent side-play of the driving and driven members and intermediate member relative to each other in an improved manner, to increase the power-transmitting capacity of such joints without material increase of dimensions, and to make the joint simple, compact, durable, and easy to incase.

I will now proceed to describe my invention with reference to the accompanying drawings, in which joints embodying my said invention are illustrated, and will then point out the novel features in claims.

In the said drawings: Figure 1 shows a side elevation and partial central longitudinal section of one form of my said joint. Fig. 2 shows a vertical transverse section thereof through the pivotal axis on the line 2—2 of Fig. 1. Fig. 3 shows a detail perspective elevation of the ball member and the socket-bushing thereon, a portion of said bushing being shown broken away. Fig. 4 shows an end view of the joint, looking from the left of Fig. 1; and Fig. 5 shows a central longitudinal section of the joint, the section being taken on a plane at right angles to the plane of section of Fig. 1. Fig. 6 shows a central longitudinal section of an alternative form of joint, wherein no bushing between the ball-member and the jaw-member of the joint is used; and Fig. 7 shows a transverse section of such alternative form of joint through the pivotal axis.

In the said drawings, 1 and 2 designate the main joint members, of which either may be the driving member and the other the driven member. 1 is a jaw member, having a transverse slot the surfaces of which form guides for the intermediate member. Such slot comprises a central portion of cylindrical cross-sectional curvature, 3, and end portions 4 the sides of which are parallel. The member 2 has at its end a head 5 of spherical curvature. Bearing-boxes 6 are arranged to slide in the portions 4 of the transverse slot, the sides of such portions serving as guides for said boxes; and a pivot-pin 7, passing through said boxes and through the spherically-curved head 5, connects said member 2 and said bearing-boxes. These boxes 6 and the pivot-pin 7 connecting them to each other and to the member 2, in effect form an intermediate member of the joint; although in practice pin 7 is commonly secured to the member 2 rigidly (as for example by said head being shrunk on to said pin); no physical rigid connection of the two bearing boxes 6 being required, as said boxes are closely confined in their movement by the guides in which they move, the sides of the bushing 8 hereinafter mentioned, and the casing 9 also hereinafter mentioned.

Between the spherically-curved head 5 of member 2 and the central portion of the slot in member 1 I interpose a bushing or bearing-box 8 (in the construction shown in Figs. 1, 2 and 3) the exterior of this bushing fitting the cylindrically-curved bore of member 1 to slide longitudinally therein, the interior of said bushing spherically-curved to receive head 5. As shown, the bushing is formed in a plurality of separable parts, to permit the introduction of the head 5 therein. Likewise, the apertures 10 in the sides of said bushing through which the pivot-pin 7 projects are elongated in the plane of movement of said bushing, as indicated in dotted lines in Fig. 1, to permit lateral oscillation of member 2 in said bushing. The outer surfaces of bearing-boxes 6 and the projecting ends of pin 7 are also spherically curved.

To retain oil within the joint and prevent the entrance of dirt and the like, I provide member 1 of the joint with a casing 9, fitting thereover and closing the transverse slot in said member at the sides. This casing is preferably cylindrical, and is provided at the end with a cap or end-inclosure 12 for said casing, the said cap being pressed up against end piece 11 by a spring 13. In the construction shown the end-piece 11 and the said cap 12 are both spherically curved, though this is not necessary. I further provide packing material 14 between said cap and end piece, and between the neck of the cap and member 2.

It will be apparent that by the construction described, motion of member 2 in any direction with reference to member 1 is permitted, said member oscillating about the axis of pivot-pin 7, or said pivot-pin and boxes 6 oscillating about an axis at right angles to said pivot-pin, or both; and that member 2 may move in or out, through a considerable range, with reference to member 1, the bushing 8 sliding in member 1 to permit this; and that throughout such movements of the member 2 the end-cap 12 contacts with end-piece 11 and keeps the joint closed.

In the joint described in my said prior application No. 334,222, the joint-member corresponding to member 2 of this joint has no spherically-curved head, and the casing of the joint is employed to prevent lateral movement of the pivot-pin and bearing boxes in the slotted member of the joint. In the joint just illustrated and described, however, the pressure of the spherically-curved head 5 against bushing 8, and the corresponding pressure of said bushing against the bore of the joint member 1, accomplishes the same purpose. There being surface-contact between 5 and 8, and between 8 and 1, the joint is able to transmit safely loads that would cause squeezing-out of the lubricant between the pressure pieces, if there were only line-contact, and so would cause cutting of the wearing-surfaces.

The jaw-member of the joint, 1, is well calculated to withstand severe pressure due to transmission of heavy loads with members 1 and 2 at a considerable angle. To stiffen it I commonly provide it with the flanges or webs 15, which at the same time serve to support the casing 9. But when the pressures to be transmitted are not so great as to make surface-contact between the coacting parts necessary or advisable, I may dispense with the bushing 8, causing the spherical head 5 of member 2 to bear directly against the sides of the cylindrical bore of member 1. This is illustrated in Figs. 6 and 7. In this latter case, it is substantially necessary that those portions of the bore of member 1 against which the head 5 may bear in the action of the joint shall be of cylindrical curvature, provided member 2 is to move in and out with reference to member 1; but in the form of joint shown in Figs. 1, 2 and 3, the cylindrical cross-section of the bore of member 1 and the cylindrical exterior of bushing 8 are merely desirable for convenience in construction, any other form permitting said bushing to move in and out of the bore of member 1 as a guide being permissible. Similarly, bearing boxes 6 merely form shoes for pivot-pin 7, and where very light loads are to be transmitted, may not be required, pin 7 sliding and pivoting on guides of member 1.

The interior of the joint is commonly occupied to greater or less extent by lubricant; to introduce which, I provide a duct 16, normally closed by a plug 17. To permit free circulation of the lubricant within the joint I provide head 5 with ducts 18.

What I claim is:—

1. A universal joint structure comprising driving and driven members, one of said members provided with a spherically-curved head and a projecting pivot-pin, the other of said members provided with straight guides for said head and pivot-pin adapted to permit longitudinal motion of said head and pin and for resisting pressure from said spherical head.

2. A universal joint structure comprising driving and driven members, one of said members provided with a spherically-curved head and with a projecting pivot-pin, and slidable members thereon, the other of said members provided with straight guides for said head and slidable members adapted to permit longitudinal motion of said members, pivot-pin and head, and for resisting pressure from said spherical head.

3. A universal joint structure comprising driving and driven members, one of said members provided with a spherically-curved head and with a projecting pivot-pin, the other of said members provided with straight guides for said head and pivot-pin adapted to permit longitudinal motion of said head and pin and with spherically-recessed bushing embracing said spherical head.

4. A universal joint structure comprising driving and driven members, one of said members provided with a spherically curved head and with a projecting pivot-pin, the other of said members provided with straight guides for said head and pivot-pin adapted to permit longitudinal motion of said head and pin and with a spherically-recessed bushing embracing said spherical head and slidable within said second member of the joint.

5. A universal joint structure comprising driving and driven members, one of said members provided with a projecting pivot-pin, the other of said members provided with straight guides for said pivot-pin and the member carrying said pin, adapted to permit longitudinal motion of said pin-carrying member and pin, the head of said pin-carrying member and surfaces of said guide-carrying member correspondingly curved to permit universal movement of the one member with respect to the other.

6. A universal joint structure comprising driving and driven members, one of said members provided with a projecting pivot-pin, the other of said members provided with straight guides for said pivot-pin and the member carrying said pin, adapted to permit longitudinal motion of said pin-carrying member and pin, said pin-carrying member and said guide-carrying member having, the one a head and the other a bushing embracing said head, the two having correspondingly-curved surfaces in surface contact with each other permitting universal movement of the one member with respect to the other.

7. An incased universal joint structure comprising driving and driven members, one of said members provided with a projecting pivot-pin, the other of said members provided with straight guides for said pin-carrying member and pivot-pin, open at the sides and adapted to permit longitudinal motion of said pin and the member carrying it, one of said members having a curved head and the other correspondingly-curved surfaces adapted to resist lateral movement of one member within the other and to permit universal movement of the members with respect to each other, and a casing closing said guides at the sides.

8. An incased universal joint structure comprising driving and driven members, having a T-head in slot connection, and adapted for relative longitudinal movement as well as universal movement, an apertured end-piece of approximately spherical curvature fitting on one of said members, a closure therefor on the other of said members, and means for pressing the one against the other.

9. A universal joint structure comprising driving and driven members, one having a curved bearing-head and pivot-pins adapting it for universal connection with the other member, the other member having guiding bearing surfaces permitting longitudinal movement of the members relatively.

10. A universal joint structure comprising driving and driven members, one having a curved bearing-head and pivot-pins adapting it for universal connection with the other member, the other member having guiding bearing surfaces permitting longitudinal movement of the members relatively, and means closing the joint, said head having in it longitudinal ducts.

In testimony whereof I affix my signature in the presence of two witnesses.

CLARENCE W. SPICER.

Witnesses:
A. W. STONE,
STANA BURDICK.